(12) United States Patent
Graaf et al.

(10) Patent No.: US 9,346,336 B2
(45) Date of Patent: May 24, 2016

(54) REFRIGERANT CIRCUIT OF AN AIR CONDITIONER WITH HEAT PUMP

(71) Applicant: Visteon Global Technologies, Inc., Van Buren Township, MI (US)

(72) Inventors: Marc Graaf, Krefeld (DE); Tobias Haas, Cologne (DE)

(73) Assignee: Hanon Systems, Daejeon-si (KR)

( * ) Notice: Subject to any disclaimer, the term of this patent is extended or adjusted under 35 U.S.C. 154(b) by 137 days.

(21) Appl. No.: 13/870,574

(22) Filed: Apr. 25, 2013

(65) Prior Publication Data

US 2013/0305753 A1 Nov. 21, 2013

(30) Foreign Application Priority Data

Apr. 26, 2012 (DE) .......................... 10 2012 103 675
Nov. 30, 2012 (DE) .......................... 10 2012 111 672

(51) Int. Cl.
| | |
|---|---|
| *F25B 1/00* | (2006.01) |
| *F25B 27/00* | (2006.01) |
| *F25D 17/06* | (2006.01) |
| *F25B 13/00* | (2006.01) |
| *B60H 1/32* | (2006.01) |

(Continued)

(52) U.S. Cl.
CPC ........ *B60H 1/00007* (2013.01); *B60H 1/00899* (2013.01); *B60H 1/3213* (2013.01); *B60G 1/02* (2013.01); *B60H 2001/00942* (2013.01); *B60H 2001/3285* (2013.01)

(58) Field of Classification Search
CPC .............................. B60G 1/02; B60G 1/00899
USPC ............. 62/238.7, 89, 324.1, 324.6, 244, 498
See application file for complete search history.

(56) References Cited

U.S. PATENT DOCUMENTS

| | | | | |
|---|---|---|---|---|
| 6,422,308 B1 * | 7/2002 | Okawara | ............ | B60H 1/00878 165/202 |
| 6,971,246 B2 * | 12/2005 | Kurata | ............... | B60H 1/00328 62/196.4 |

(Continued)

FOREIGN PATENT DOCUMENTS

| | | |
|---|---|---|
| DE | 19644583 A1 | 4/1998 |
| DE | 20121533 U1 | 11/2002 |

(Continued)

*Primary Examiner* — Frantz Jules
*Assistant Examiner* — Steve Tanenbaum
(74) *Attorney, Agent, or Firm* — Fraser Clemens Martin & Miller LLC; James D. Miller

(57) ABSTRACT

A refrigerant circuit of an air conditioning system for a passenger compartment of a motor vehicle having a primary circuit having a compressor configured to compress a refrigerant, a first heat exchanger in fluid communication with the compressor and configured to transfer heat between a refrigerant and the environment, a first expansion element in fluid communication with the first heat exchanger, and a second heat exchanger in fluid communication with the first expansion element and the compressor, the second heat exchanger configured to dehumidify intake air of the passenger compartment and a secondary circuit having a first flow pathway and a second flow pathway, the first flow pathway having a third heat exchanger in fluid communication with the compressor and configured to transfer heat from the refrigerant to the passenger compartment and a second expansion element in fluid communication with the third heat exchanger, and a third expansion element.

3 Claims, 1 Drawing Sheet

(51) Int. Cl.
    *B60H 1/00*   (2006.01)
    *B60G 1/02*   (2006.01)

(56) References Cited

U.S. PATENT DOCUMENTS

| | | | |
|---|---|---|---|
| 7,028,492 B2 | 4/2006 | Taras et al. | |
| 7,028,767 B2 * | 4/2006 | Takano | B60H 1/00914 165/202 |
| 2004/0134217 A1 * | 7/2004 | Itoh | B60H 1/00392 62/324.1 |
| 2007/0283703 A1 * | 12/2007 | Heckt | B60H 1/00907 62/3.61 |
| 2009/0241573 A1 * | 10/2009 | Ikegami | B60H 1/00335 62/238.7 |
| 2011/0067427 A1 * | 3/2011 | Haller | B60H 1/005 62/324.6 |
| 2012/0085114 A1 | 4/2012 | Graaf et al. | |
| 2012/0117993 A1 | 5/2012 | Takahashi | |

FOREIGN PATENT DOCUMENTS

| | | |
|---|---|---|
| DE | 102006026359 A1 | 12/2007 |
| DE | 102008038627 A1 | 2/2010 |
| DE | 102009028522 A1 | 5/2011 |
| DE | 102010038406 A1 | 1/2012 |
| DE | 102011109055 A1 | 3/2012 |
| EP | 1878985 A2 | 1/2008 |

* cited by examiner

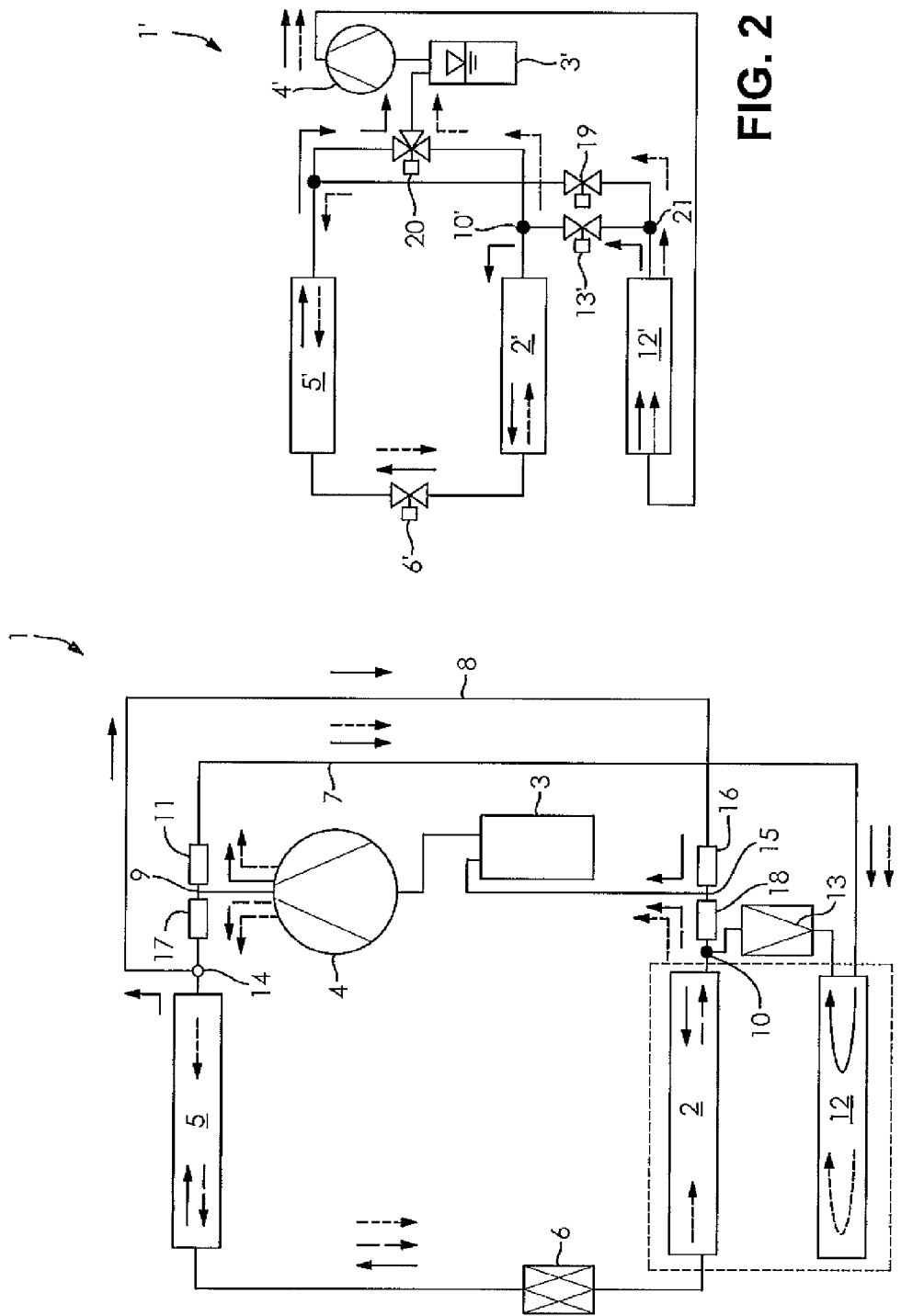

REFRIGERANT CIRCUIT OF AN AIR CONDITIONER WITH HEAT PUMP

CROSS-REFERENCE TO RELATED APPLICATION

This application claims priority to German Provisional Patent Application Serial No. DE 10 2012 103 675.6 filed Apr. 26, 2012 and German Non-Provisional Patent Application Serial No. DE 10 2012 111 672.5 filed on Nov. 30, 2012, hereby incorporated herein by reference in its entirety.

FIELD OF THE INVENTION

The invention relates to a refrigerant circuit of an air conditioner for conditioning the air of a passenger compartment of a motor vehicle. The refrigerant circuit, designed for a combined operation in air conditioner and heat pump mode, has a compressor, a heat exchanger for heat transfer between the refrigerant and the surroundings, a first expansion element and a heat exchanger for heat transfer from the air of the passenger compartment being conditioned to the refrigerant and a heat exchanger for heat transfer from the refrigerant to the air of the passenger compartment being conditioned. Furthermore, the invention concerns a method for operating the refrigerant circuit of the air conditioner.

BACKGROUND OF THE INVENTION

This section provides background information related to the present disclosure which is not necessarily prior art. In motor vehicles known from prior art, the waste heat of the engine is used to heat the air intake for the passenger compartment. The waste heat is transported by means of the refrigerant circulating in the engine cooling circuit to the air conditioner, where it is transferred by the heating system heat exchanger to the air flowing into the passenger compartment. The known systems with refrigerant/air heat exchangers, which draw heating power from the cooling circuit of an efficient internal combustion engine of the vehicle propulsion system at low ambient temperatures no longer achieve the required level for a comfortable heating of the passenger compartment to meet the overall heating demand of the passenger compartment. The same holds for systems in vehicles with hybrid propulsion or exclusively electrically operated vehicles.

When the overall heating demand of the passenger compartment cannot be met by the heat from the engine cooling circuit, additional heating measures are necessary, such as electrical resistance heaters (PTC) or fuel-operated heaters. A more efficient option for heating the air for the passenger compartment is a heat pump with air as the heat source, where the refrigerant circuit serves both as a single heating system and an extra heating feature.

Air/air heat pumps of the prior art, which are designed for combined air conditioner and heat pump mode, and consequently also for the heating mode, take up heat from the surrounding air. Power is transferred between the refrigerant and air. Heat pump systems, which cannot dehumidify and heat the air supplied to the passenger compartment at the same time, cannot be operated at low ambient temperatures with surrounding air, that is, with air recirculating from the passenger compartment. Due to the lack of a dehumidifying function, the remaining humidity of the air as well as the water given off in the form of vapor from the passengers would result in fogging of the windows. On the other hand, in regions with temperature climate and ambient temperatures in the range of around 0° to 20° C., it is often demanded of the air conditioning system to operate the evaporator with the goal of dehumidifying the intake air of the passenger compartment.

For traditional air conditioning systems, when ambient temperatures are above 20° C., after reaching thermal comfort, the air being supplied to the passenger compartment is cooled down to around 2° C. to 10° C. and thereby sufficiently dehumidified. But due to the low ambient temperature, the cooled and dehumidified air cannot be supplied directly to the passenger compartment. In vehicles with internal combustion engines, the air is then reheated to the desired intake air temperature making use of the waste heat of the engine. A set point temperature for the passenger compartment of around 20° C. to 25° C. is considered thermal comfort, for example.

In the so-called "reheat" mode, the air being supplied to the passenger compartment is consequently cooled down, and thereby dehumidified, and then slightly heated again. In this operating mode, the required reheating power is less than the cooling power needed to cool and dehumidify the air.

In DE 10 2006 026 359 A1, an air conditioning system is described with a refrigerant circuit for a combined operation in the cooling unit and heat pump mode. The disclosed heat pump system consists of a primary circuit and a secondary passage divided into various sections. The primary circuit contains the components already known from a classical compression refrigerating machine such as a compressor, two heat exchangers, and a throttling element. The secondary passage has an additional heat exchanger operated as a heat pump condenser. The air conditioning system enables a reheating only in the heat pump operation. Furthermore, the heating power given off to the air in the additional heat exchanger of the secondary passage is always greater than the cooling power taken up in the heat exchanger of the primary circuit, designed as an evaporator. Heat pump systems that are configured for this operation in the reheating mode are also known from the prior art.

DE 10 2011 109 055 A1 discloses an air conditioning system for a vehicle with a refrigerant circuit that can operate in the heat pump and the cooling unit mode. The refrigerant circuit here has a compressor, an internal heat exchanger, and an external heat exchanger operating as a condenser in the cooling unit mode. The internal heat exchanger, operated as an evaporator, is coordinated with an internal heating condenser. The air conditioning system furthermore comprises a device for creating an air mass flow that can be thermally coupled to the internal heat exchanger and the internal heating condenser as well as an adjusting device by means of which the flow through the internal heating condenser can be adjusted with a partial air mass flow of the thermally coupled air mass flows. Consequently, the internal heating condenser, receiving a continuous flow as a heat pump condenser is coupled at the air side to the internal heat exchanger configured as an evaporator. The heating power in the reheat mode is regulated by varying the partial air mass flow across the heat pump condenser.

In this case, when operating in the reheat mode the pressure of the refrigerant in the heat pump condenser cannot be adjusted significantly above the pressure level in the external heat exchanger and the intake air for the passenger compartment cannot be heated substantially above the temperature of the ambient air. The pressure in the external heat exchanger is essentially determined by the temperature of the ambient air. With rising temperature of the ambient air, the heating power furnished by the system will rise, but in any case the heating power required for thermal comfort of the passenger compartment will also become less at higher ambient air temperatures. Consequently, at high ambient air temperatures, the system can adequately provide heating power when operating in the reheat mode, but it has a heating power deficit at low ambient air temperatures, for example, at temperatures below 20° C. In order to generate the required heating power, the system must be operated in the pure heat pump mode. Yet in this operating mode, adequate dehumidification of the intake air for the passenger compartment cannot be realized. The refrigerant circuit then switches between the heat pump mode and the cooling unit mode.

In DE 10 2009 028 522 A1 an air conditioning system is disclosed with a refrigerant circuit configured as a heat pump system. The refrigerant circuit likewise has a primary circuit, as a modification of the refrigerant circuit from DE 10 2006 026 359 A1, and a secondary branch with a heat pump condenser. Thanks to a division of the overall refrigerant mass flow into a first partial mass flow through the primary circuit in which the cooling power is transferred to the evaporator and a second partial mass flow through the secondary passage in which the heating power is transferred to the heat pump condenser, an operation in reheat mode is made possible with the heating power regulated independently of the cooling power.

However, in this design of the refrigerant circuit as well, the pressure of the refrigerant in the heat pump condenser cannot be adjusted independently of the ambient temperature and thus cannot be set significantly above the pressure level in the condenser of the primary circuit. Although adequate heating power can be made available when operating in the reheat mode, the temperature level is not sufficient for a comfortable air conditioning of the passenger compartment at ambient air temperatures less than 20° C. To achieve the heating power needed for this, the air conditioning system has to be operated in the pure heat pump mode, but then sufficient dehumidification of the intake air for the passenger compartment cannot be assured. As with the air conditioner from DE 10 2011 109 055 A1, the refrigerant circuit switches between the heat pump mode and the cooling unit mode.

SUMMARY OF THE INVENTION

The problem addressed by the present invention is modifying an air conditioning system with a refrigerant circuit for different operating modes, especially the reheat mode, so that the air being supplied to the passenger compartment can be heated to a high temperature level in the range of up to 50° C. to 60° C. independently of the required cooling power and of the temperature level of the ambient air. This should be accomplished with no additional external energy-consuming heat sources, such as a PTC heating.

Furthermore, the problem addressed by the present invention is to provide a method for operating the refrigerant circuit making possible, especially in the reheat mode, an efficient operation and heating of the air being supplied to the passenger compartment at a temperature level above that of the ambient air, independently of the required cooling power and the temperature level of the ambient air.

The problem is solved by a refrigerant circuit of an air conditioning system for the passenger compartment of a motor vehicle that is configured for a combined operation in the cooling unit and heat pump mode, as well as a reheat mode. The refrigerant circuit according to the invention has a compressor, a heat exchanger for heat transfer between the refrigerant and the surroundings, a first expansion element as well as a heat exchanger for heat supply from the passenger compartment air being conditioned to the refrigerant. Furthermore, the refrigerant circuit is configured with a heat exchanger for heat transfer from the refrigerant to the passenger compartment air being conditioned and a second expansion element connected to the latter in the flow direction of the refrigerant.

According to an embodiment of the invention, the refrigerant circuit has a third expansion element with variable flow cross section. The third expansion element is configured and arranged in the refrigerant circuit so that, in the completely opened state of the expansion element, a flow of refrigerant practically free of pressure losses is guaranteed and with a reduction of the flow cross section the pressure level in the heat exchanger for heat transfer from the refrigerant to the passenger compartment air being conditioned can be adjusted through the pressure level in the heat exchanger for the heat transfer between the refrigerant and the surroundings. For the flow practically free of pressure losses, the flow cross section of the expansion element corresponds essentially to the flow cross sections of the refrigerant circuit connection lines arranged at the expansion element.

According to another embodiment of the invention, the heat exchanger for heat transfer between the refrigerant and the surroundings and the heat exchanger for heat supply from the passenger compartment air being conditioned to the refrigerant are each configured for bidirectional flow. Furthermore, the first expansion element advantageously has two flow paths containing refrigerant in opposite directions. The first expansion element has bidirectional flow in two opposite directions of flow.

Another advantageous embodiment of the invention is that a branching point is formed after the compressor in the refrigerant flow direction, at which the refrigerant mass flow during the operation in reheat mode can be divided into one partial mass flow through the heat exchanger for heat transfer from the refrigerant to the air being conditioned for the passenger compartment and one partial mass flow through the heat exchanger for heat transfer between the refrigerant and the surroundings. The third expansion element in this case is advantageously arranged between the branching point and the heat exchanger for heat transfer between the refrigerant and the surroundings.

The heat exchanger for heat transfer from the refrigerant to the air being conditioned for the passenger compartment, which in the reheat mode serves to reheat the previously cooled and/or dehumidified air, is also called the reheater and the heat exchanger for the heat transfer between the refrigerant and the surroundings, which in the reheat mode is operated to condense the refrigerant, is also called the condenser/gas cooler.

Advantageously, the refrigerant circuit has a primary circuit and a secondary line. The compressor, the heat exchanger for heat transfer between the refrigerant and the surroundings, the first expansion element and the heat exchanger for heat supply from the passenger compartment air being conditioned to the refrigerant are arranged in the primary circuit.

The secondary line is preferably formed from two flow pathways. The first flow pathway extends from a branching point arranged between the compressor and the heat exchanger for heat transfer between the refrigerant and the surroundings to an outlet point arranged between the heat exchanger for heat supply from the passenger compartment air being conditioned to the refrigerant and the compressor. The first flow pathway advantageously has the heat exchanger for heat transfer from the refrigerant to the passenger compartment air being conditioned and the second expansion element. The second flow pathway extends from a branching point between the compressor and the heat exchanger for heat transfer between the refrigerant and the surroundings to an outlet point arranged between the heat exchanger for heat supply from the passenger compartment air being conditioned to the refrigerant and the compressor.

The mass flows of the refrigerant during operation in the reheat mode can advantageously be divided between the primary circuit and the first flow pathway. The third expansion element is preferably arranged between the branching point of the first flow pathway and the branching point of the second flow pathway of the secondary line within the primary circuit. The primary circuit, furthermore, has a valve configured as a shutoff valve or a switching valve between the outlet points of the flow pathways of the secondary line.

According to a another embodiment of the present invention, the heat exchanger for heat transfer from the refrigerant to the passenger compartment air being conditioned and the heat exchanger for heat transfer between the refrigerant and the surroundings are connected directly to each other via a connection line. The third expansion element is disposed inside the connection line. The entire mass flow of refrigerant circulating in the refrigerant circuit flows through both heat exchangers in succession. As compared to the first embodiment of the invention, the mass flow of refrigerant during operation in the reheat mode is not divided into a partial mass flow through the first and a partial mass flow through the second heat exchanger. The thermal powers are adjusted by means of the different pressure levels or temperature levels.

The problem of the invention is furthermore solved by a refrigerant circuit of an air conditioning system for the air of a passenger compartment of a motor vehicle according to the invention, having a compressor and a branching point arranged after the compressor in the flow direction of the refrigerant, a heat exchanger for heat transfer between the refrigerant and the surroundings, and a heat exchanger for heat transfer from the refrigerant to the passenger compartment air being conditioned. The refrigerant circuit is designed for a combined operation of the air conditioning system in the cooling unit and heat pump mode, as well as a reheat mode. The mass flow of refrigerant during the operation in reheat mode can be divided into a partial mass flow through the re-heater and a partial mass flow through the condenser/gas cooler.

According to the concept of the invention, an expansion element with variable flow cross section is arranged inside the refrigerant circuit between the branching point and the heat exchanger for heat transfer between the refrigerant and the surroundings. The expansion element is designed so that, in the fully opened state, a flow of refrigerant free of pressure losses is assured and with a reduction of the flow cross section the pressure level in the heat exchanger for heat transfer from the refrigerant to the passenger compartment air being conditioned can be adjusted through the pressure level in the heat exchanger for the heat transfer between the refrigerant and the surroundings. When the refrigerant circuit is operating in the reheat mode, the pressure level of the refrigerant in the re-heater is thus higher than the pressure level in the condenser/gas cooler.

One method according to the invention for operating a refrigerant circuit of an air conditioning system for the passenger compartment of a motor vehicle that is configured for a combined operation in the cooling unit and heat pump mode, as well as a reheat mode, with a compressor, a heat exchanger for heat transfer between the refrigerant and the surroundings, a heat exchanger for heat transfer from the refrigerant to the passenger compartment air being conditioned, and an expansion element, has the following steps during the operation in reheat mode: dividing the refrigerant mass flow into a partial mass flow through the reheater and a partial mass flow through the condenser/gas cooler, and reducing the flow cross section of the expansion element and expanding the partial mass flow through the condenser/gas cooler as it flows through the expansion element, at the same time raising the pressure level of the partial mass flow through the reheater.

According to an embodiment of the invention, the pressure level of the refrigerant in the reheater is raised above the pressure level of the refrigerant in the condenser/gas cooler, that is, the pressure level of the refrigerant in the reheater is higher than the pressure level in the condenser/gas cooler. Thus, the temperature of the refrigerant in the reheater is regulated independently of the temperature of the refrigerant in the condenser/gas cooler, so that the air being delivered to the passenger compartment is heated to a temperature above the temperature of the ambient air.

Another method according to the invention for operating a refrigerant circuit of an air conditioning system for the passenger compartment of a motor vehicle that is configured for a combined operation in the cooling unit and heat pump mode, as well as a reheat mode, with a compressor, a heat exchanger for heat transfer between the refrigerant and the surroundings, a heat exchanger for heat transfer from the refrigerant to the passenger compartment air being conditioned, and an expansion element, has the following steps during the operation in reheat mode: reducing the flow cross section of the expansion element and expanding the refrigerant mass flow from a higher pressure level in the reheater as it flows through the expansion element to a lower pressure level in the condenser/gas cooler, and regulating the temperature of the refrigerant in the reheater independently of the temperature of the refrigerant in the condenser/gas cooler so that the air being delivered to the passenger compartment is heated to a temperature above the temperature of the ambient air.

The refrigerant is expanded before reaching the condenser/gas cooler as it flows through the expansion element and at the same time the pressure level of the refrigerant in the reheater is raised. The pressure level of the refrigerant in the reheater is thus above the pressure level of the refrigerant in the condenser/gas cooler.

According to an embodiment of the invention, refrigerant flows in opposite direction through the heat exchanger for heat transfer between the refrigerant and the surroundings when operating in the cooling unit and reheat mode, as compared to operation in the heat pump mode.

According to another advantageous embodiment of the invention, whereby the refrigerant circuit has a heat exchanger for heat supply from the passenger compartment air being conditioned to the refrigerant, as well as an expansion element arranged between this heat exchanger and the heat exchanger for heat transfer between the refrigerant and the surroundings, refrigerant flows in opposite direction through the expansion element and the heat exchanger for heat supply from the passenger compartment air being conditioned to the refrigerant when operating in the cooling unit and reheat mode, as compared to operation in the heat pump mode.

The special advantage of the invention is that, when operating in the reheat mode, the pressure of the refrigerant in the reheater is set significantly above the pressure level in the condenser/gas cooler as the heat exchanger for the heat transfer between refrigerant and surroundings and thus the intake air for the passenger compartment can be heated substantially above the temperature of the ambient air. With the refrigerant circuit, sufficient heating power can be provided in the reheat mode both at high and at low ambient air temperature, for example, below 20° C. Furthermore, an adequate dehumidification of the intake air for the passenger compartment can be assured in this operating mode.

Further benefits of the refrigerant circuit of the air conditioning system as compared to the prior art can be summarized as follows: quick providing of warm air at low ambient temperatures and cold cooling water of the engine cooling circuit when used in hybrid vehicles, reduction of the required power for heating the passenger compartment and possible heating in recirculating ventilation operation, good dynamics and modest complexity as compared to other extra heating systems with comparable functionalities, and, reheat operation in which the heating power of the reheater is lower than the cooling power in the evaporator.

BRIEF DESCRIPTION OF THE DRAWINGS

Further details, features and benefits of the invention will emerge from the following description of sample embodiments, making reference to the corresponding drawings. The figures represent the refrigerant circuits of the air conditioning system each time in cooling unit, heat pump or reheat operation. There are shown:

FIG. 1 illustrates a refrigerant circuit with primary circuit and secondary passage with an expansion element at the high pressure side of the primary circuit, and FIG. 2 illustrates a refrigerant circuit with an expansion element in the connection line between two heat exchangers each operating as condenser/gas cooler in the reheat mode.

DETAILED DESCRIPTION OF EXEMPLARY EMBODIMENTS OF THE INVENTION

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

FIG. 1 shows a refrigerant circuit 1 of the vehicle's air conditioning system with a primary circuit and a secondary line or circuit. During operation in the cooling unit mode, the refrigerant flows through the primary circuit in succession through the heat exchanger 2, operated as an evaporator, the collector 3, the compressor 4, the heat exchanger 5 operated as a condenser/gas cooler, and the expansion element 6 configured as an expansion valve with bidirectional flow. The direction of flow of the refrigerant is shown here by means of arrows and broken lines.

The refrigerant circulating to cool down the air being supplied to the passenger compartment is compressed in the compressor 4 and taken to the heat exchanger 5. In the heat exchanger 5, the refrigerant gives up heat to the ambient air. Next, the refrigerant flows through the expansion element 6 and is expanded to the pressure level prevailing in the evaporator 2. The two-phase mixture produced in this way is evaporated in the heat exchanger 2 and the air being supplied to the passenger compartment is cooled down to the desired temperature. After exiting from the heat exchanger 2, the refrigerant is taken to the collector 3, in which the refrigerant liquid still present upon incomplete evaporation is separated and saved. The refrigerant is drawn in from the collector 3 by the compressor 4 and again compressed.

If the refrigerant is liquefied in subcritical operation, for example, as occurs with the refrigerant R134a or with carbon dioxide under certain ambient conditions, the heat exchanger 5 is called a condenser. A portion of the heat transfer takes place at constant temperature. In supercritical operation or at supercritical heat transfer in the heat exchanger 5, the temperature of the refrigerant drops steadily. In this case, the heat exchanger 5 is also called a gas cooler. Supercritical operation can occur under certain ambient conditions or modes of operation of the vehicle's air conditioning system 1 with carbon dioxide as refrigerant.

When operating in the heat pump mode, refrigerant flows through the primary circuit, as well as the secondary line formed from two flow pathways 7, 8. The first flow pathway 7 extends from the branching point 9 to the outlet point 10 of the primary circuit. The branching point 9 is situated, in the flow direction of refrigerant, downstream from the compressor 4, that is, at the exit of the compressor 4, and the outlet point 10 is situated in the flow direction of refrigerant when operating in cooling unit mode downstream from the heat exchanger 2, that is, at the exit of the heat exchanger 2. The first flow pathway 7 has, downstream from the branching point 9 in the flow direction of refrigerant, a valve 11, a heat exchanger 12 configured as a condenser/gas cooler, and then an expansion element 13.

The second flow pathway 8 extends from the branching point 14 to the outlet point 15 of the primary circuit. The branching point 14 is situated, in the flow direction of refrigerant when operating in the cooling unit mode, upstream from the heat exchanger 5, that is, at the entrance of the heat exchanger 5, and the outlet point 15 is situated upstream from the collector 3, that is, at the entrance of the collector 3. The second flow pathway 8 has a valve 16.

Another valve 17, 18 is arranged each time between the branching points 9, 14 and the outlet points 10, 15 of the secondary passage in the refrigerant circuit 1. Each time the valves 11, 17 are configured as a valve arrangement with the branching point 9 and the valves 16, 18 with the outlet point 15.

In heat pump mode, the valves 11, 16, 17, 18 are actuated so that the refrigerant mass flow is taken downstream from the compressor 4 through the first flow pathway 7 and thus through the heat exchanger 12, operated as a condenser/gas cooler. Whereas in the operation in cooling unit mode, the valves 11, 16 are closed and the valves 17, 18 are opened, when operating in heat pump mode the valves 11, 16 are opened and the valves 17, 18 are closed. The arrows with solid lines illustrate the flow direction of refrigerant when operating in heat pump mode.

In the heat exchanger 12, heat is transferred from the refrigerant to the air being supplied to the passenger compartment. The heat exchanger 12, operated as a condenser/gas cooler, is also called the reheater. The refrigerant is then expanded in the expansion element 13, configured as an expansion valve, from the high pressure level to a medium pressure level between the level of heat transfer in the heat exchanger 12 and the level of heat transfer in the heat exchanger 5. Thus, with the help of the medium pressure level, the temperature level in the heat exchanger 2 on the refrigerant side is regulated, being operated as an evaporator. The refrigerant is partly evaporated in the heat exchanger 2, whereupon the air being supplied to the passenger compartment is cooled down and dehumidified. If one makes sure that the air temperature upstream from the evaporator 2 is higher than 0° C., the air flowing across the heat exchanger 2 can be dehumidified without frosting of the heat transfer surface and the dried air can be warmed or heated in the condenser/gas cooler 12 to a temperature level required for heating of the passenger compartment. The refrigerant partly evaporated in the heat exchanger 2 is expanded to a pressure level in the two-phase region corresponding to the ambient temperature in the expansion element 6, configured with bidirectional flow. The flow through the bidirectional-flow expansion element 6 is opposite with respect to the operation in cooling unit mode. In the heat exchanger 5, heat from the surroundings is taken up by the refrigerant and the refrigerant is further evaporated. After reaching the branching point 14, the refrigerant flows through the second flow pathway 8 of the secondary passage, passes through the valve 16 and flows into the collector 3. The refrigerant circuit 1 is closed.

Besides the ambient air as a heat source, the latent heat of the air of the passenger compartment can also be used. The heat taken away upon dehumidification of the ambient air, especially upon cool down or temperature change of the air flow, is returned to the air flow as a sensible proportion in the heat exchanger 12. The latent portion of the heat taken away upon dehumidification for condensation of the air humidity and not causing any temperature change in the air flow does not have to be returned to the air flow. Since there is no reheating of this portion of the heat taken away from the ambient air, the latent heat constitutes an additional heat supply to the refrigerant circuit 1.

The operation in reheat mode of the refrigerant circuit 1 is shown by means of the arrows with dotted lines. The expansion element 13 here is regulated, with valves 11, 17 opened, so that a heating power can be provided at the heat exchanger 12, which can be less than the cooling power at the heat exchanger 2. The heating power at the heat exchanger 12, operated as a condenser/gas cooler, is thus regulable independently of the cooling power in the heat exchanger 2, operated as an evaporator. The valve 18 is likewise opened, while the valve 16 is closed.

The valve 17 of the valve arrangement located downstream from the compressor 4 in the flow direction of refrigerant is designed as a regulated expansion element, especially an outside regulated expansion valve. The fully opened valve 17 enables a flow of refrigerant practically free of pressure losses when the refrigerant circuit 1 is operating in the cooling unit mode, with a maximum opening diameter that corresponds to the inner diameter of the connection lines.

When the refrigerant circuit 1 is operating in the reheat mode, the valve 17 is regulated such that a higher pressure level is adjusted in the heat exchanger 12, operated as a condenser/gas cooler, than in the heat exchanger 5, operated as a condenser/gas cooler. The flow cross section in the expansion element 17, configured as an expansion valve, is decreased in this case. The pressure and temperature level in the heat exchanger 12 for reheating or warming the air being supplied to the passenger compartment can thus be adjusted independently of the temperature of the surrounding air flowing around the heat exchanger 5.

The pressure level of the refrigerant in the heat exchanger 5 is dictated essentially by the temperature of the ambient air, besides the admission flow and the through flow, as well as the design. By reducing the flow cross section in the expansion element 17 configured as an expansion valve, the pressure level of the refrigerant in the heat exchanger 5 is decreased. But since this pressure level is dependent on the external conditions of the surroundings, with the decreasing of the flow cross section of the expansion element 17 the pressure of the refrigerant is increased upstream from the expansion element 17 in the flow direction of refrigerant.

The valve 11, which enables flow through the first flow pathway 7 of the secondary passage in its opened state, is designed as a switching valve or a shutoff valve. When the valve 11 is opened, the pressure level in the heat exchanger 12 is thus regulated with the decreasing of the flow cross section in the expansion element 17.

Although the valve 17 when operating in reheat mode does not receive the partial mass flow of refrigerant through the heat exchanger 12 for the reheating of the air being supplied to the passenger compartment, the pressure level and thus the temperature level within the heat exchanger 12 is regulated by adjusting the flow cross section of the valve 17. With the varying and adapting of the temperature level inside the heat exchanger 12, the temperature of the intake air for the passenger compartment is adjusted independently of the temperature of the surrounding air.

FIG. 2 shows a refrigerant circuit 1' of the vehicle air conditioning system, which differs in particular in the design of the secondary line from the refrigerant circuit 1 of FIG. 1.

When operating in the cooling unit mode and in reheat mode, the refrigerant starting from the compressor 4' flows in succession through the heat exchanger 12', the valve 19, the heat exchanger 5' operated as a condenser/gas cooler, the expansion element 6' designed as a bidirectional-flow expansion valve, and across the three-way valve 20 into the collector 3'. The flow direction of refrigerant is shown by means of arrows with dot and dash lines.

When the refrigerant circuit 1' is operating in cooling unit mode, the circulating refrigerant for the cooling of the air being supplied to the passenger compartment is compressed in the compressor 4' and taken to the heat exchanger 12'. The heat exchanger 12', situated in the channel for the intake air for the passenger compartment, does not admit any air, and no heat is transferred.

The fully opened valve 19, configured as an outside regulated expansion element, especially an expansion valve, enables a flow of refrigerant that is practically free of pressure losses with a maximum opening diameter that corresponds to the inner diameter of the connection lines. The refrigerant then flows through the heat exchanger 5', operated as a gas cooler/condenser, and gives up heat to the surrounding air, becoming cooled and condensed. The refrigerant takes up heat in the heat exchanger 2'. The air being supplied to the passenger compartment is cooled down and dehumidified.

When the refrigerant circuit 1' is operating in the reheat mode, the refrigerant compressed in the compressor 4' is likewise taken to the heat exchanger 12'. In the condenser/gas cooler 12', heat from the refrigerant is transferred to the air being supplied to the passenger compartment. The air becomes heated. The heat exchanger 12' is also known as a reheater.

The expansion element 19 is regulated so that a higher pressure level is set in the heat exchanger 12' than in the heat exchanger 5', also operated as a condenser/gas cooler. By decreasing the flow cross section of the expansion element 19, the pressure and temperature level in the heat exchanger 12' for the reheating or warming of the air being supplied to the passenger compartment is increased independently of the temperature of the surrounding air flowing around the heat exchanger 5'.

The pressure level of the refrigerant in the heat exchanger 5' is dictated by the admission flow and the through flow, as well as the design, but also essentially by the temperature of the ambient air. Thanks to reducing the flow cross section in the expansion element 19 configured as an expansion valve, the pressure level of the refrigerant in the heat exchanger 5' is thus decreased. But since this pressure level is dependent on the external conditions of the surroundings, with the decreasing of the flow cross section of the expansion element 19 the pressure of the refrigerant is increased or regulated upstream from the expansion element 19 in the flow direction of refrigerant and thus in the heat exchanger 12'.

The refrigerant mass flow whose pressure is being adjusted flows through the valve 19. The expansion mechanism is situated inside the connection line between the heat exchanger 12' and the heat exchanger 5', which are each operated as a condenser/gas cooler.

With the varying and adapting of the temperature level inside the heat exchanger 12', the temperature of the intake air for the passenger compartment is adjusted independently of the temperature of the surrounding air.

After emerging from the heat exchanger 5', operated as a condenser/gas cooler, the refrigerant both when operating in cooling unit mode and in reheat mode passes through the expansion element 6', being expanded to the pressure level prevailing in the evaporator 2'. The two-phase mixture formed in this way is evaporated in the heat exchanger 2' and the air being supplied to the passenger compartment is cooled down and dehumidified. After emerging from the heat exchanger 2', the refrigerant is taken through the three-way valve 20 to the collector 3', in which the refrigerant liquid still present due to incomplete evaporation is separated and accumulated. The refrigerant is drawn out from the collector 3' by the compressor 4'. The refrigerant circuit 1' is closed.

When operating in heat pump mode, the refrigerant circulates similar to FIG. 1 in the refrigerant circuit 1'. It flows through a connection line extending from a branching point 21 at the exit of the heat exchanger 12' to an outlet point 10'. The outlet point 10' is situated at the exit of the heat exchanger 2' in the flow direction of refrigerant in the cooling unit mode. The connection line has an expansion element 13' designed as an expansion valve. The valve 19 is closed. The arrows with solid lines illustrate the refrigerant flow direction when operating in heat pump mode.

In the heat exchanger 12', heat of the refrigerant compressed by the compressor 4' is transferred to the air being supplied to the passenger compartment. The refrigerant is then expanded in the expansion element 13' from the high pressure level to a medium pressure level between the level for heat transfer in the heat exchanger 12' and the level for heat transfer in the heat exchanger 5'. Thus, with the help of the medium pressure level, the temperature level in the evaporator 2' on the refrigerant side is regulated. A heating power can be provided at the heat exchanger 12' which can be less than the cooling power at the heat exchanger 2'. The heating power at the heat exchanger 12', operated as a condenser/gas cooler, is thus regulable independently of the cooling power in the heat exchanger 2', operated as an evaporator.

The refrigerant is partly evaporated in the heat exchanger 2', whereupon the air being supplied to the passenger compartment is cooled down and dehumidified. The dried air is heated again to a temperature level needed for the heating of the passenger compartment in the condenser/gas cooler 12'.

The refrigerant partly evaporated in the heat exchanger 2' is expanded to a pressure level in the two-phase region corresponding to the ambient temperature in the expansion element 6', configured with bidirectional flow. The flow through the bidirectional-flow expansion element 6' is opposite with respect to the operation in cooling unit mode. In the heat exchanger 5', heat from the surroundings is taken up by the refrigerant and the refrigerant is further evaporated. After emerging from the heat exchanger 5', the refrigerant is taken through the three-way valve 20 to the collector 3' and is drawn in by the compressor 4'. The refrigerant circuit 1' is closed.

From the foregoing description, one ordinarily skilled in the art can easily ascertain the essential characteristics of this invention and, without departing from the spirit and scope thereof, can make various changes and modifications to the invention to adapt it to various usages and conditions.

LIST OF REFERENCE SYMBOLS 1, 1' refrigerant circuit
2, 2' heat exchanger, evaporator
3, 3' collector
4, 4' condenser
5, 5' heat exchanger
6, 6' expansion element
7 first flow pathway, secondary line
8 second flow pathway, secondary line
9 branching point
10, 10' outlet point
11 valve
12, 12' heat exchanger, condenser/gas cooler
13, 13' expansion element
14 branching point
15 outlet point
16 valve
17 valve, expansion element
18 valve
19 valve, expansion element
20 three-way valve
21 branching point

What is claimed is:

1. A refrigerant circuit of an air conditioning system for a passenger compartment of a motor vehicle comprising:
 a primary circuit having a compressor configured to compress a refrigerant, a first heat exchanger in fluid communication with the compressor and configured to transfer heat between a refrigerant and the environment, a first expansion element in fluid communication with the first heat exchanger, and a second heat exchanger in fluid communication with the first expansion element and the compressor, the second heat exchanger configured to dehumidify an intake air;
 a secondary circuit having a first flow pathway and a second flow pathway, the first flow pathway having a third heat exchanger in fluid communication with the compressor and configured to transfer heat from the refrigerant to the intake air, and a second expansion element in fluid communication with the third heat exchanger;
 a third expansion element disposed downstream of the compressor in respect of a direction of flow of a refrigerant through the primary circuit;
 a first branching point disposed downstream of the compressor, the first branching point configured to divide a flow of the refrigerant between the third heat exchanger of the first flow pathway and the first heat exchanger of the primary circuit, wherein the second heat exchanger is disposed upstream of the compressor, wherein the first flow pathway extends from the first branching point to a first outlet point disposed intermediate the second heat exchanger and the compressor, wherein the second flow pathway extends from a second branching point disposed intermediate the compressor and the first heat exchanger to a second outlet point disposed intermediate the first outlet point and the compressor, and wherein the third expansion element is disposed intermediate the first branching point and the second branching point; and
 a valve disposed downstream of the compressor, the valve configured to shut off the first flow pathway.

2. The refrigerant circuit of claim 1, wherein the third expansion element has a variable flow cross section, the variable flow cross section having an open position configured to allow a refrigerant to flow substantially free of pressure losses, wherein an adjustment of the variable flow cross section of the third expansion element regulates a pressure at the third heat exchanger.

3. The refrigerant circuit of claim 1, wherein the first heat exchanger is configured for bidirectional flow.

\* \* \* \* \*